(12) United States Patent
Nishiura

(10) Patent No.: US 9,908,563 B2
(45) Date of Patent: Mar. 6, 2018

(54) WHEEL HOUSE STRUCTURE

(71) Applicant: TOYOTA JIDOSHA KABUSHIKI KAISHA, Toyota-shi, Aichi-ken (JP)

(72) Inventor: Masaaki Nishiura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/291,432

(22) Filed: Oct. 12, 2016

(65) Prior Publication Data
US 2017/0137069 A1 May 18, 2017

(30) Foreign Application Priority Data

Nov. 13, 2015 (JP) ................. 2015-223095

(51) Int. Cl.
| | |
|---|---|
| *B60J 7/00* | (2006.01) |
| *B62D 25/18* | (2006.01) |
| *B62D 35/00* | (2006.01) |
| *B62D 25/16* | (2006.01) |
| *B62D 37/02* | (2006.01) |

(52) U.S. Cl.
CPC ........... B62D 25/18 (2013.01); B62D 25/161 (2013.01); B62D 35/00 (2013.01); B62D 37/02 (2013.01); *Y02T 10/88* (2013.01)

(58) Field of Classification Search
CPC ...... B62D 25/16; B62D 25/088; B62D 25/08; B62D 25/087; B62D 25/02; B62D 25/2036; B62D 21/152; B62D 25/025; B60D 1/06

USPC .......................................................... 296/198
See application file for complete search history.

(56) References Cited

U.S. PATENT DOCUMENTS

| | | | | |
|---|---|---|---|---|
| 4,549,762 A * | 10/1985 | Burk ...................... | B60K 11/08 180/68.1 |
| 5,340,154 A * | 8/1994 | Scott ...................... | B62D 25/18 280/154 |
| 6,354,003 B1 * | 3/2002 | Lehmann ................ | B29C 44/12 29/460 |
| 7,086,692 B2 * | 8/2006 | Sebastian ............... | B60K 11/00 296/198 |
| 8,146,987 B2 * | 4/2012 | Uchino .................. | B62D 25/16 296/198 |
| 8,162,380 B2 * | 4/2012 | Sumitani .............. | B62D 25/161 296/180.1 |

(Continued)

FOREIGN PATENT DOCUMENTS

| | | |
|---|---|---|
| JP | 2004-338602 A | 12/2004 |
| JP | 2009-001045 A | 1/2009 |
| JP | 2010-202040 A | 9/2010 |

*Primary Examiner* — Kiran B Patel
(74) *Attorney, Agent, or Firm* — Oliff PLC

(57) ABSTRACT

The present invention provides a wheel house structure having: a wheel house front wall that structures a wall at a front side of a wheel house in which a front tire is disposed; and an air discharging portion that is structured to include one or more through-holes formed along a vehicle vertical direction at a vehicle transverse direction outer side of the wheel house front wall, the air discharging portion discharging air, that is further toward a vehicle longitudinal direction front side than the wheel house front wall, through the through-hole obliquely rearward toward a vehicle longitudinal direction rear side and a vehicle transverse direction outer side.

7 Claims, 7 Drawing Sheets

(56) References Cited

U.S. PATENT DOCUMENTS

| | | | | |
|---|---|---|---|---|
| 8,297,685 B2* | 10/2012 | Wolf | ............... | B62D 35/005 |
| | | | | 296/180.1 |
| 2007/0182207 A1* | 8/2007 | Nakaya | ............ | B62D 25/182 |
| | | | | 296/180.1 |
| 2010/0078927 A1 | 4/2010 | Takeuchi | | |
| 2015/0048648 A1* | 2/2015 | Wolf | ............... | B62D 25/16 |
| | | | | 296/180.5 |
| 2015/0225026 A1* | 8/2015 | Ohira | ............ | B62D 25/08 |
| | | | | 296/180.1 |
| 2015/0246697 A1* | 9/2015 | Kishima | ............ | B62D 25/16 |
| | | | | 296/180.1 |
| 2015/0307137 A1* | 10/2015 | Kishima | ............ | B62D 25/18 |
| | | | | 280/848 |
| 2015/0329151 A1* | 11/2015 | Kishima | ............ | B62D 35/02 |
| | | | | 296/180.1 |
| 2016/0144905 A1* | 5/2016 | Nishiura | ............ | B62D 25/02 |
| | | | | 296/180.1 |
| 2016/0280289 A1* | 9/2016 | Watanabe | ............ | B62D 35/02 |

* cited by examiner

WHEEL HOUSE STRUCTURE

CROSS-REFERENCE TO RELATED APPLICATION

This application is based upon and claims the benefit of priority of the prior Japanese Patent Application No. 2015-223095, filed on Nov. 13, 2015, the entire contents of which are incorporated herein by reference.

FIELD

The embodiments discussed herein are related to a wheel house structure.

BACKGROUND

Japanese Patent Application Laid-Open (JP-A) No. 2009-1045 discloses a wheel house structure that has a fender liner that is formed so as to cover the upper portion of the tire in order to act as a mudguard or the like.

However, at a vehicle to which the aforementioned wheel house structure is applied, a flow of air, that is jetted-out from the wheel house in the vehicle transverse direction outer side direction, arises, and, as a result, there is the concern that the flow of air at the side of the tire will be disturbed. If the flow of air at the side of the tire is disturbed, the air resistance with respect to the vehicle increases, and further, the handling stability deteriorates.

SUMMARY

In view of the above-described circumstances, the present invention is to provide a wheel house structure that can stabilize the flow of air at the side of a tire, and therefore, can reduce air resistance with respect to the vehicle and improve the handling stability.

A wheel house structure of a first aspect has: a wheel house front wall that structures a wall at a front side of a wheel house in which a front tire is disposed; and an air discharging portion that is structured to include one or more through-holes formed along a vehicle vertical direction at a vehicle transverse direction outer side of the wheel house front wall, the air discharging portion discharging air, that is further toward a vehicle longitudinal direction front side than the wheel house front wall, through a through-hole obliquely rearward toward a vehicle longitudinal direction rear side and the vehicle transverse direction outer side.

The wheel house structure of the first aspect has the wheel house front wall that structures the wall at the front side of the wheel house in which the front tire is disposed. Further, the wheel house structure has the air discharging portion. The air discharging portion is structured to include one or more through-holes that are formed in the wheel house front wall. The one or more through-holes are formed in the vehicle transverse direction outer side of the wheel house front wall. Further, due to the air discharging portion, air, that is further toward the vehicle longitudinal direction front side than the wheel house front wall, is discharged-out through the through-hole obliquely rearward toward the vehicle longitudinal direction rear side and the vehicle transverse direction outer side. Therefore, the air that is discharged-out from the through-hole hitting the front tire, or entering-into the portion at the vehicle transverse direction inner side of the wheel house, is suppressed, and the air flows toward the side of the front tire.

In addition, the one or more through-holes are formed along the vehicle vertical direction. Therefore, for example, as compared with a case in which one through-hole that is substantially square is formed, the flow of air toward the side of the front tire can be produced over a wide range that extends in the vehicle vertical direction. As a result, a flow of air, that is jetted-out from the wheel house in the vehicle transverse direction outer side direction, is suppressed, and the flow of air at the side of the front tire is stable.

In a wheel house structure of a second aspect, in the wheel house structure of the first aspect, the one or more through-holes are formed at a height position that includes a vehicle vertical direction substantially central portion of the wheel house front wall.

As a result of experimentation, it is known that, in a case in which the through-hole is formed at the substantially central portion in the vehicle vertical direction of the wheel house front wall, the effect of reducing air resistance with respect to the vehicle is high as compared with a case in which the through-hole is formed in other than the substantially central portion. Here, in the wheel house structure of the second aspect, the one or more through-holes are formed at a height position that includes the substantially central portion in the vehicle vertical direction of the wheel house front wall. Therefore, in accordance with the wheel house structure of the second aspect, air resistance with respect to the vehicle can be reduced even more effectively.

In a wheel house structure of a third aspect, in the wheel house structure of the first aspect, plural through-holes are formed.

In the wheel house structure of the third aspect, plural through-holes are formed. Therefore, it is easy to ensure the strength of the wheel house front wall, as compared with a case in which one through-hole is formed along the vehicle vertical direction.

In a wheel house structure of a fourth aspect, in the wheel house structure of the first aspect, a plate thickness direction of a through-hole base portion, in which the one or more through-holes are formed, at the wheel house front wall is directed obliquely rearward toward the vehicle longitudinal direction rear side and the vehicle transverse direction outer side.

In the wheel house structure of the fourth aspect, the plate thickness direction of the through-hole base portion, in which the one or more through-holes are formed, at the wheel house front wall is directed obliquely rearward toward the vehicle longitudinal direction rear side and the vehicle transverse direction outer side. Therefore, the direction of the air that is discharged-out from the through-hole can, by a simple structure, be directed obliquely rearward toward the vehicle longitudinal direction rear side and the vehicle transverse direction outer side.

In a wheel house structure of a fifth aspect, in the wheel house structure of the fourth aspect, an inner side adjacent portion, that is adjacent to a vehicle transverse direction inner side of the through-hole base portion, is displaced toward a vehicle front side while heading toward a vehicle transverse direction inner side, and an outer side adjacent portion, that is adjacent to a vehicle transverse direction outer side of the through-hole base portion, is displaced toward a vehicle rear side while heading toward the vehicle transverse direction outer side.

In the wheel house structure of the fifth aspect, the inner side adjacent portion, that is adjacent to the vehicle transverse direction inner side of the through-hole base portion, is displaced toward the vehicle front side while heading toward the vehicle transverse direction inner side. Further, the outer side adjacent portion, that is adjacent to the vehicle transverse direction outer side of the through-hole base portion, is displaced toward the vehicle rear side while heading toward the vehicle transverse direction outer side. Therefore, the flow of air, that is discharged-out through the through-hole obliquely rearward toward the vehicle longitudinal direction rear side and the vehicle transverse direction outer side, can be made to run along the inner side adjacent portion and the outer side adjacent portion. As a result, a more stable flow of air at the side of the front tire can be formed.

In a wheel house structure of a sixth aspect, in the wheel house structure of the first aspect, ribs that guide air obliquely rearward, are disposed at the vehicle front side of the one or more through-holes, at a through-hole base portion of the wheel house front wall, in which the one or more through-holes are formed.

In the wheel house structure of the sixth aspect, the direction of the air that is discharged out from the through-hole can be directed obliquely rearward toward the vehicle longitudinal direction rear side and the vehicle transverse direction outer side.

In a wheel house structure of a seventh aspect, in the wheel house structure of the first aspect, a direction, in which the one or more through-holes pass through a through-hole base portion of the wheel house front wall, is directed obliquely rearward toward the vehicle longitudinal direction rear side and the vehicle transverse direction outer side.

In the wheel house structure of the seventh aspect, the direction of the air that is discharged out from the through-hole can be directed obliquely rearward toward the vehicle longitudinal direction rear side and the vehicle transverse direction outer side.

Further, the wheel house structure relating to the first aspect of the present disclosure can stabilize the flow of air at the side of the tire, and therefore, can reduce air resistance with respect to the vehicle and improve the handling stability.

DESCRIPTION OF EMBODIMENTS

A vehicle 10, to which a wheel house structure S relating to a first exemplary embodiment of the present disclosure is applied, is described hereinafter by using the drawings. Note that arrow FR, arrow UP and arrow OUT, that are shown appropriately in the respective drawings, indicate the forward direction (namely, the advancing direction) of the vehicle, the upward direction, and the vehicle transverse direction outer side direction, respectively. Hereinafter, when explanation is given by using merely longitudinal, left-right and vertical directions, they refer to the longitudinal of the longitudinal direction of the vehicle, the left and right of the left-right direction of the vehicle (namely, the vehicle transverse direction), and the vertical of the vehicle vertical direction, unless otherwise stated.

(Overall Structure)

Figure 1:
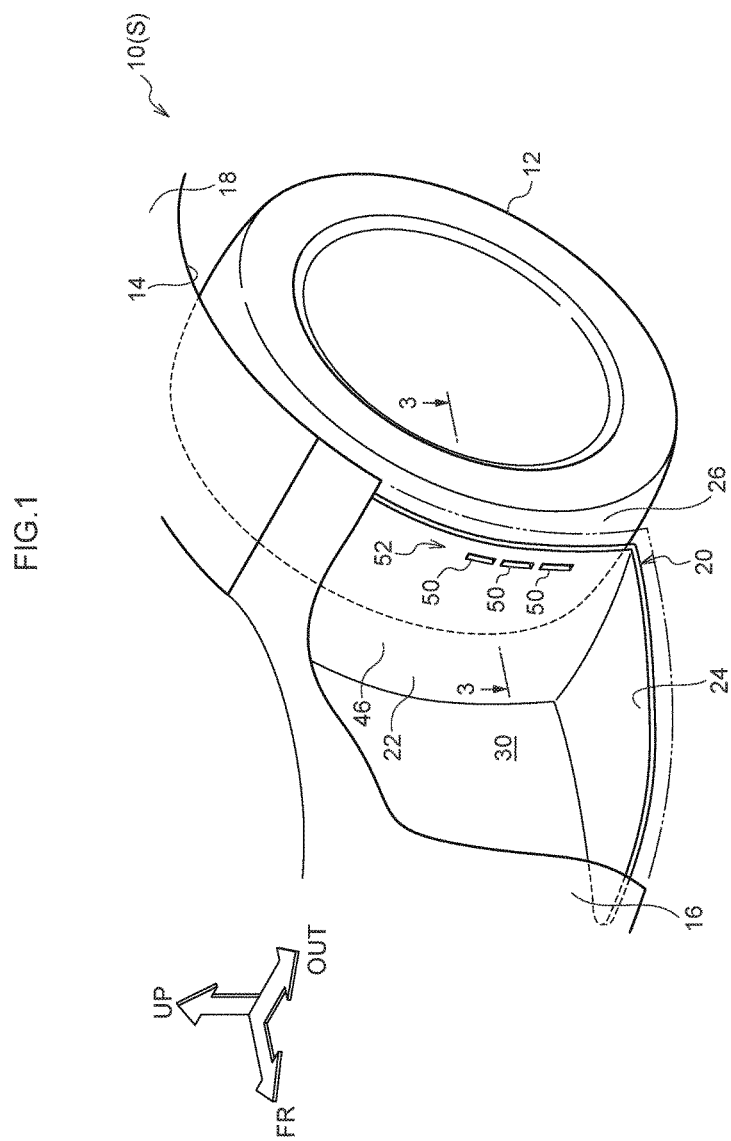
FIG. 1 is a perspective view showing the structure at the periphery of a front tire of a vehicle, to which a wheel house structure of a first exemplary embodiment is applied, in a state in which a portion of a bumper cover is cut-out.

The structure of the periphery of a front tire 12 of a vehicle 10 is shown in FIG. 1. As shown in FIG. 1, the vehicle 10 has the front tire 12, a bumper cover 16 and a front fender panel 18 that structure exterior parts at the front portion of the vehicle 10 and in which a wheel arch 14 is formed, and a front fender liner 20 that is mounted to the wheel arch 14 so as to conform thereto.

The front fender liner 20 has a liner main body 22 that covers the upper portion of the front tire 12 from the vehicle upper side, and a liner front side extending portion 24 that extends toward the vehicle front side from the front end of the liner main body 22.

Figure 2:
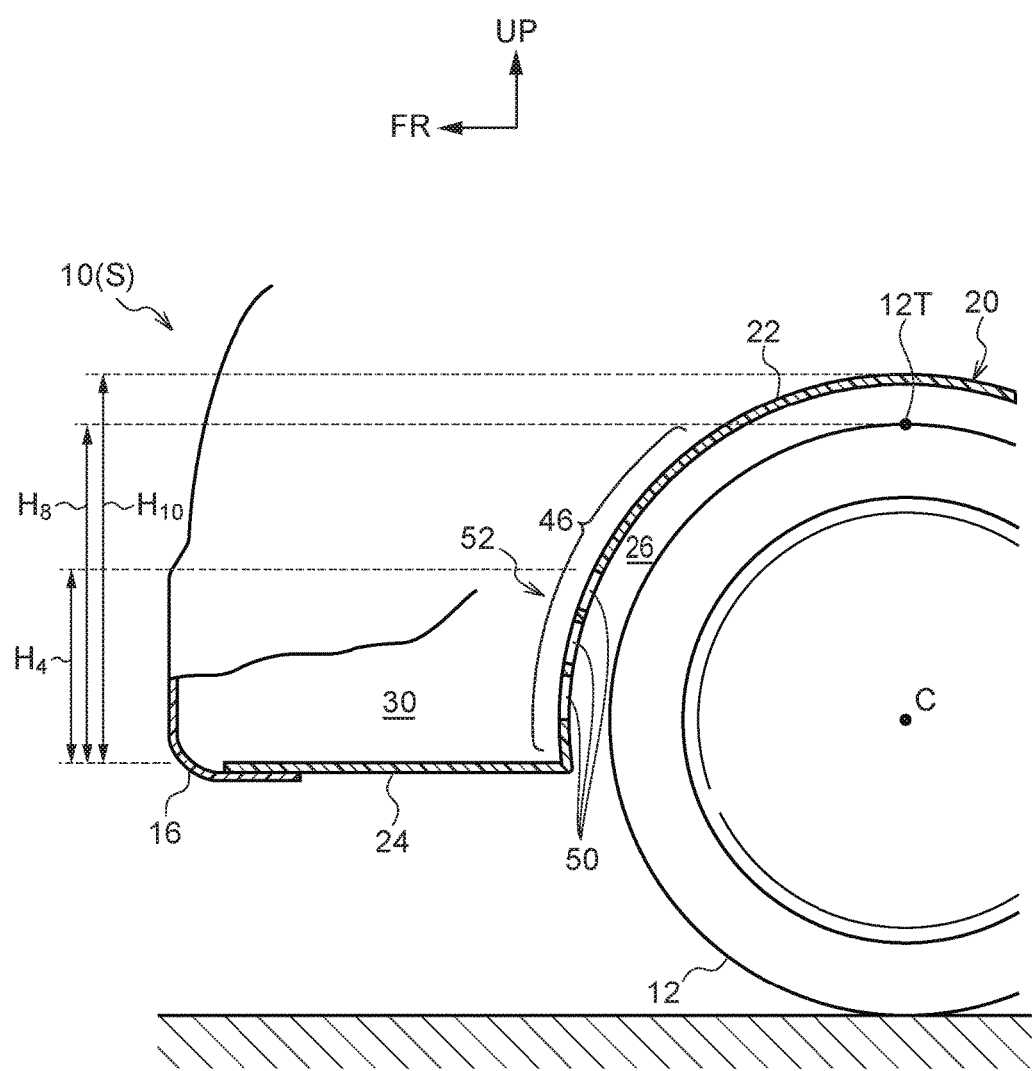
FIG. 2 is a side view showing the bumper cover of FIG. 1 and a front fender liner, with portions thereof cut-out.

As shown in FIG. 2, the liner main body 22 is circular-arc-shaped as see in a vehicle side view, and is a shape that extends in the vehicle transverse direction. Due thereto, the liner main body 22 is the walls at the vehicle front side, the vehicle upper side and the vehicle rear side of a wheel house 26 that is the space in which the front tire 12 is disposed. In the FIG. 2 embodiment, the vehicle vertical direction lower end of the liner main body 22 is positioned slightly lower than a center C of the front tire 12.

The liner front side extending portion 24 is disposed with the plate thickness direction thereof directed in the vehicle vertical direction, and so as to be further toward the vehicle front side than the wheel house 26. Due thereto, the liner front side extending portion 24 is a portion of the lower side wall of a front compartment 30 that is a space that is demarcated by the bumper cover 16 and the like.

The bumper cover 16 is an exterior part that structures the design surface from the front surface of the vehicle 10 to, of the side surface of the vehicle 10, the portion that is in front of the front tire 12. Further, as shown in FIG. 1, the front fender panel 18 is mounted as the exterior part of the upper portion and the rear portion of the front tire 12. A cut-out that is arch-shaped as seen in a vehicle side view (for example, the wheel arch 14) is formed in the bumper cover 16 and the front fender panel 18.

Figure 3:
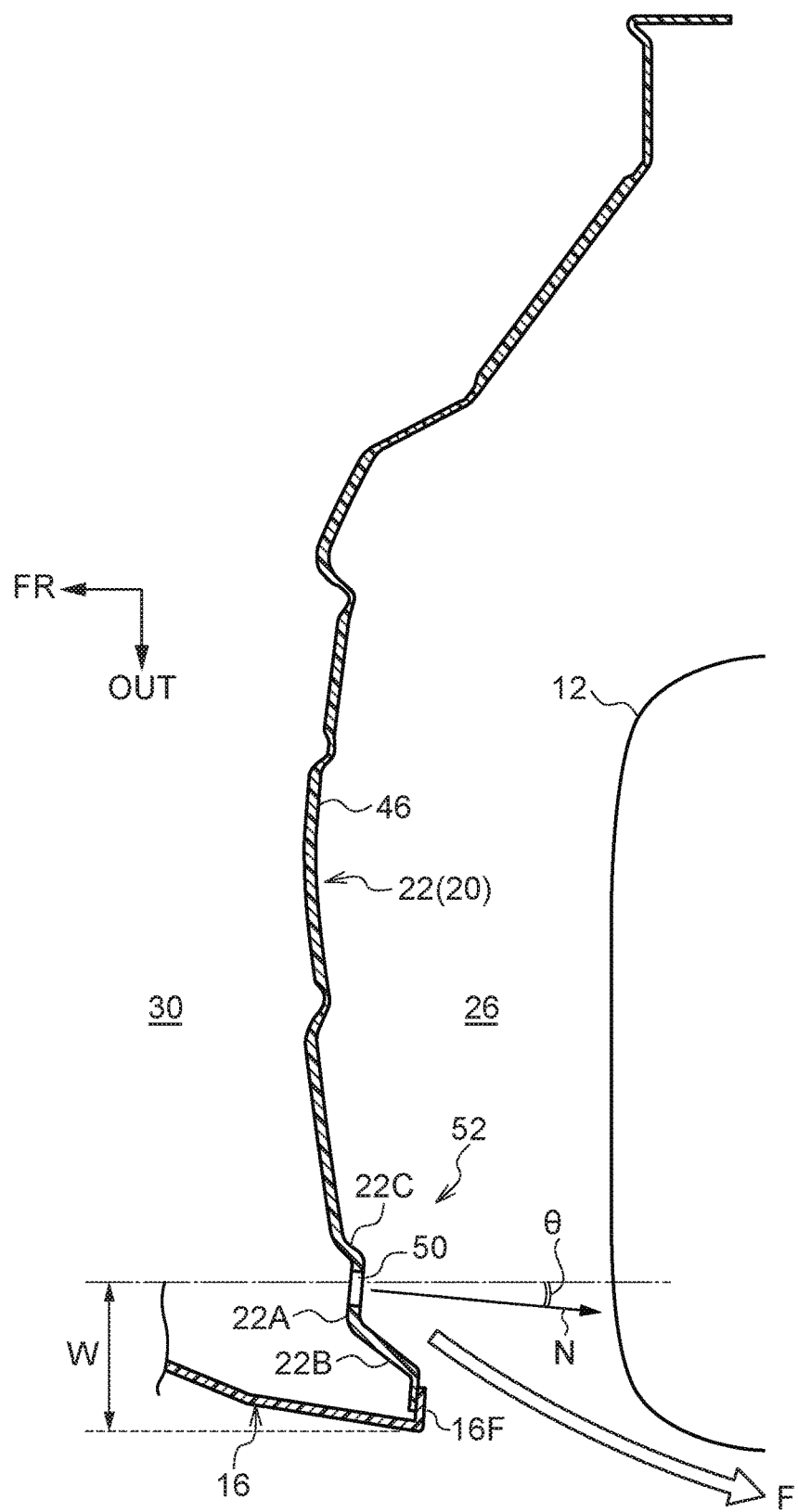
FIG. 3 is a cross-sectional view along line 3-3 of FIG. 1 that shows, in an enlarged manner, the bumper cover, a wheel house front wall, and the front tire.

In the FIG. 1 embodiment, as shown in FIG. 3, a flange portion 16F is formed at the rear end of the bumper cover 16. Further, the vehicle transverse direction outer side end portion of the liner main body 22 of the front fender liner 20 is mounted to the flange portion 16F. Due thereto, in the FIG. 3 embodiment, of the liner main body 22 of the front fender liner 20 and the flange portion 16F of the bumper cover 16, a portion 46 (see FIG. 2), that is further toward the vehicle lower side and vehicle front side than an upper end 12T of the front tire 12, structures the wall at the front side of the wheel house 26 at which the front tire 12 is disposed. Namely, in the FIG. 3 embodiment, the portion 46 corresponds to the "wheel house front wall" of the present disclosure.

(Structure of Main Portions)

As shown in FIG. 1, plural through-holes 50 are formed in the wheel house front wall 46 along the vehicle vertical direction. Concretely, the plural through-holes 50 (for example, the three through-holes 50) are formed at the portion of the liner main body 22, which portion corresponds to the front of the front tire 12. The plural through-holes 50 are formed so as to be lined-up in the vehicle vertical direction, and the shapes of the respective through-holes 50 are made to be shapes of long holes whose length directions are the vehicle vertical direction. The front compartment 30 and the wheel house 26 are communicated by these plural through-holes 50.

(Vehicle Transverse Direction Position)

Further, the position at which the plural through-holes 50 are formed is at the vehicle transverse direction outer side at the wheel house front wall 46. Concretely, the position of the plural through-holes 50 in the vehicle transverse direction is in a vicinity of the vehicle transverse direction outer side end of the liner main body 22. Due thereto, as shown in FIG. 3, distance W in the vehicle transverse direction from the vehicle transverse direction outer side end of the wheel house front wall 46 (for example, the vehicle transverse direction outer side end of the flange portion 16F of the bumper cover 16) to the centers of the through-holes 50 is less than or equal to 100 mm (namely, W 100 mm). Namely, the vehicle transverse direction outer side at the wheel house front wall 46 designates a range that is 100 mm or less toward the vehicle transverse direction inner side from the vehicle transverse direction outer side end of the wheel house front wall 46.

(Angle of Through-Hole Base Portion)

Further, as shown in FIG. 3, the plate thickness direction (for example, arrow N) of a portion 22A of the liner main body 22, at which portion 22A the through-holes 50 are formed (i.e., the portion 22A that structures the peripheral edges of the through-holes 50, and hereinafter is called through-hole base portion 22A), is directed obliquely rearward that is toward the vehicle longitudinal direction rear side and the vehicle transverse direction outer side. In other words, the plate thickness direction (for example, arrow N) of the through-hole base portion 22A is inclined by angle θ toward the vehicle transverse direction outer side with respect to the vehicle longitudinal direction rear direction (refer to the one-dot chain line in FIG. 3). The angle θ is set to be greater than or equal to 10° and less than or equal to 80°.

(Angles of Outer Side Adjacent Portions/Inner Side Adjacent Portions)

Further, an outer side adjacent portion 22B, that is adjacent to the through-hole base portion 22A and extends obliquely rearward that is toward the vehicle longitudinal direction rear side and the vehicle transverse direction outer side, is formed at the vehicle transverse direction outer side of the through-hole base portion 22A. Further, an inner side adjacent portion 22C, that is adjacent to the through-hole base portion 22A and extends obliquely frontward that is toward the vehicle longitudinal direction front side and the vehicle transverse direction inner side, is formed at the vehicle transverse direction inner side of the through-hole base portion 22A.

As described above, because the plate thickness direction of the through-hole base portion 22A in which the through-holes 50 are formed is directed obliquely rearward that is toward the vehicle longitudinal direction rear side and the vehicle transverse direction outer side, air within the front compartment 30 is discharged through the through-holes 50 obliquely rearward that is toward the vehicle longitudinal direction rear side and the vehicle transverse direction outer side (refer to arrow F). Moreover, the outer side adjacent portion 22B and the inner side adjacent portion 22C, that are adjacent to the through-hole base portion 22A in the vehicle transverse direction, are formed so as to run along the aforementioned flow of air (refer to arrow F). Therefore, for this reason as well, the air that is discharged-out from the through-holes 50 can be led obliquely rearward that is toward the vehicle longitudinal direction rear side and the vehicle transverse direction outer side.

Note that, in the FIG. 3 embodiment, the through-hole base portion 22A in which the through-holes 50 are formed, and the outer side adjacent portion 22B and the inner side adjacent portion 22C correspond to the "air discharging portion" (for example, air discharging portion 52) of the present disclosure.

<Operation/Effects>

Operation and Effects of the Wheel House Structure S of the FIGS. 1-3 Embodiment are Described Next.

The wheel house structure S has the air discharging portion 52 that is structured to include the plural through-holes 50 that are formed in the wheel house front wall 46 (concretely, the liner main body 22). Further, the through-holes 50 are formed in the vehicle transverse direction outer side of the wheel house front wall 46, and air is discharged-out from the through-holes 50 obliquely rearward that is toward the vehicle longitudinal direction rear side and the vehicle transverse direction outer side. Therefore, as shown in FIG. 3, the air that is discharged-out from the through-holes 50 hitting the front tire 12, and entering into the vehicle transverse direction inner side portion of the wheel house 26, are suppressed, and the air flows toward the side of the front tire 12 (refer to arrow F).

In addition, the plural through-holes 50 are formed along the vehicle vertical direction. Therefore, for example, as compared with a case in which one through-hole that is substantially square is formed, the flow of air toward the side of the front tire 12 can be formed over a wide range that extends in the vehicle vertical direction. As a result, a flow of air, that is jetted-out from the wheel house 26 in the vehicle transverse direction outer side direction, is suppressed, and the flow of air at the side of the front tire 12 is stable.

Figure 6:
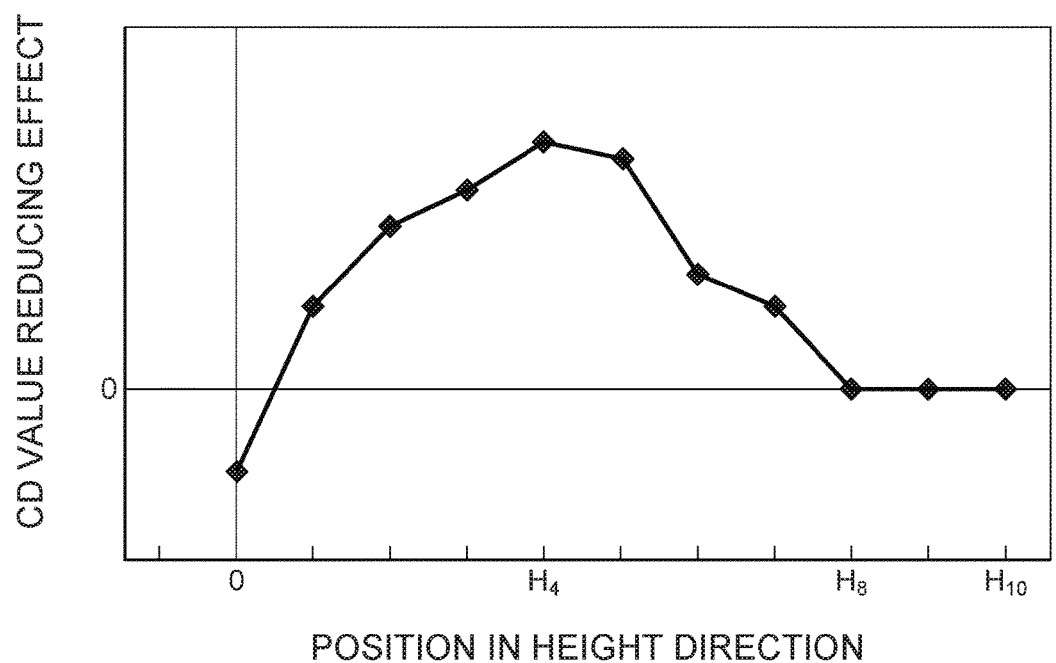
FIG. 6 is a graph showing the relationship between the positions of the through-holes shown in FIG. 2 in the height direction, and the air resistance reducing effect.

The relationship (namely, a relationship that is based on experimentation) between the position of the through-hole 50 in the height direction and the air resistance reducing effect, namely, the CD value reducing effect is shown in FIG. 6. Here, the CD value is the air resistance coefficient (namely, coefficient of drag), and expresses, as a numerical value, the resistance characteristic of an individual object regardless of the size of the outer shape. The greater the CD value, the easier it is for the boundary layer of the airflow of an object to separate, and the easier it is for a vortex to arise. Further, the CD value reducing effect means the effect of reducing the air resistance with respect to the vehicle, with a case in which no through-holes are provided being expressed as zero. The greater the CD value reducing effect is from zero, the greater the effect of reducing air resistance. As shown in FIG. 6, it can be understood that, in a case in which the through-hole 50 is formed at the substantially central portion in the vehicle vertical direction of the wheel house front wall 46 (for example, height position H4 in FIG. 2), the air resistance reducing effect is high as compared with cases in which the through-hole 50 is formed at other than the substantially central portion.

Here, in the wheel house structure S of the FIG. 2 embodiment, the through-holes 50 are formed at height positions that include the substantially central portion in the vehicle vertical direction of the wheel house front wall 46 (for example, the height position H4 in FIG. 2). Therefore, at the wheel house structure S, air resistance with respect to the vehicle 10 can be reduced even more effectively.

Further, at the wheel house structure S of the FIG. 2 embodiment, the plural through-holes 50 are formed along the vehicle vertical direction. Therefore, as compared with a case in which one through-hole is formed along the vehicle vertical direction, each of the individual through-holes 50 can be formed to be small, and therefore, it is easy to ensure the strength of the liner main body 22 of the front fender liner 20.

Further, at the wheel house structure S of the FIG. 2 embodiment, the plate thickness direction (for example, arrow N) of the through-hole base portion 22A, in which the through-holes 50 are formed, at the wheel house front wall 46 is directed obliquely rearward that is toward the vehicle longitudinal rear side and the vehicle transverse direction outer side. Therefore, the direction of the air that is discharged-out from the through-holes 50 can, by a simple structure, be made to be directed obliquely rearward that is toward the vehicle longitudinal direction rear side and the vehicle transverse direction outer side.

Further, at the wheel house structure S of the FIG. 2 embodiment, the inner side adjacent portion 22C, that is adjacent to the vehicle transverse direction inner side of the through-hole base portion 22A, is displaced toward the vehicle front side while heading toward the vehicle transverse direction inner side, and the outer side adjacent portion 22B, that is adjacent to the vehicle transverse direction outer side of the through-hole base portion 22A, is displaced toward the vehicle rear side while heading toward the vehicle transverse direction outer side. Therefore, the flow of air, that is discharged-out through the through-holes 50 obliquely rearward that is toward the vehicle longitudinal direction rear side and the vehicle transverse direction outer side, can be made to run along the inner side adjacent portion 22C and the outer side adjacent portion 22B. As a result, a more stable flow of air at the side of the front tire 12 can be formed.

Figure 4:
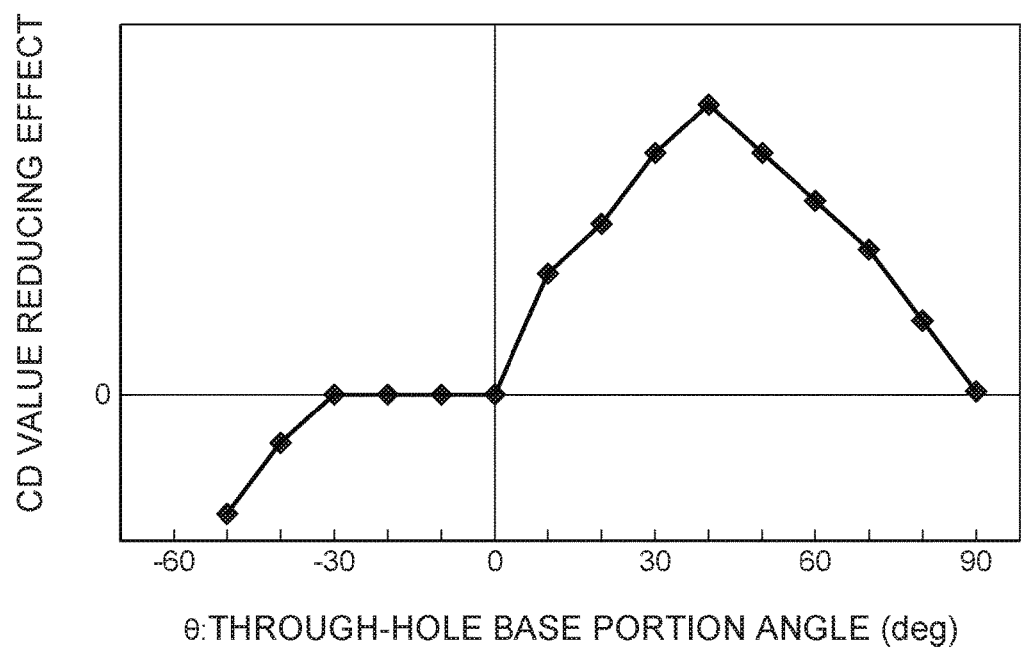
FIG. 4 is a graph showing the relationship between angle θ, with respect to the vehicle longitudinal direction, of the plate thickness direction (for example, arrow N) of a through-hole base portion shown in FIG. 3, and the air resistance reducing effect.
Figure 5:
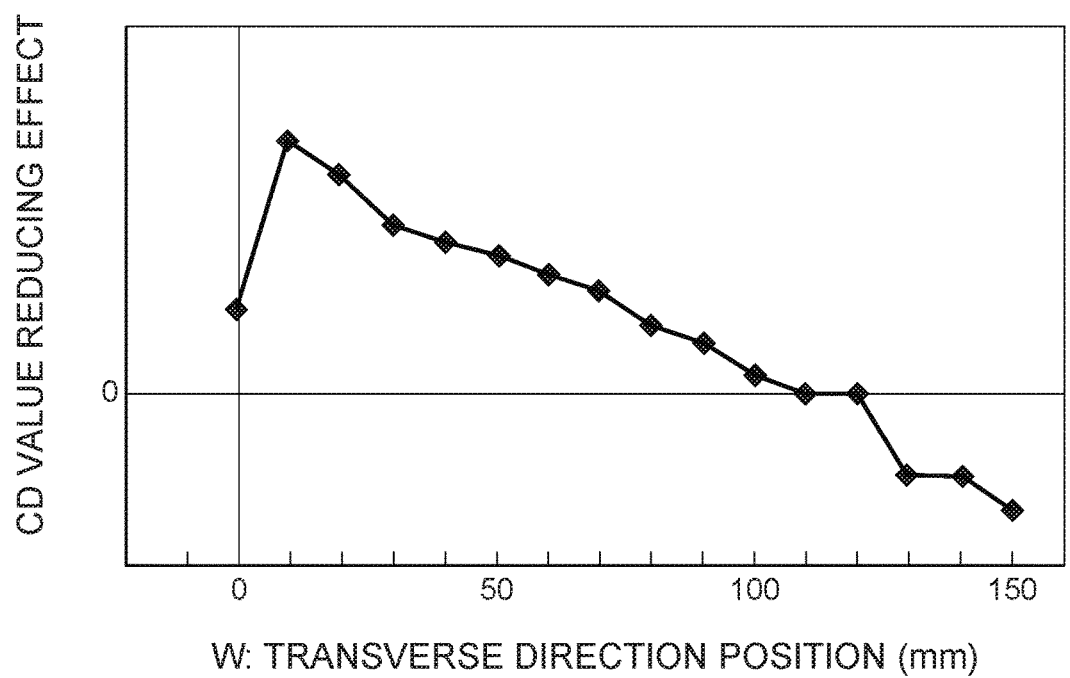
FIG. 5 is a graph showing the relationship between the position in the vehicle transverse direction of a through-hole shown in FIG. 3, namely, distance W from a vehicle transverse direction outer side end of the wheel house front wall, and the air resistance reducing effect.

Lastly, the relationship between the way of providing the through-holes 50 and the air resistance reducing effect (namely, the CD value reducing effect) is described by using FIG. 4 and FIG. 5. Because FIG. 6 was described above, explanation thereof is omitted here. Note that the CD value is the air resistance coefficient (namely, the coefficient of drag), and expresses, as a numerical value, the resistance characteristic of an individual object regardless of the size of the outer shape. Further, the CD value reducing effect means the effect of reducing the air resistance with respect to the vehicle, with a case in which no through-holes are provided being expressed as zero. The greater the CD value reducing effect is from zero, the greater the effect of reducing air resistance.

The relationship between the angle θ of the plate thickness direction (for example, arrow N) of the through-hole base portion 22A with respect to the vehicle longitudinal direction, and the CD value reducing effect is shown in FIG. 4. As shown in FIG. 4, it can be understood that the CD value reducing effect is achieved in cases in which θ is greater than or equal to 10° and less than or equal to 80°. Moreover, it can be understood that the CD value reducing effect is achieved even more markedly in cases in which θ is greater than or equal to 20° and less than or equal to 60°.

The relationship between the position of the through-hole 50 in the vehicle transverse direction (for example, the distance W from the vehicle transverse direction outer side of the wheel house front wall 46), and the CD value reducing effect, is shown in FIG. 5. As shown in FIG. 5, it can be understood that the CD value reducing effect is achieved when W is less than or equal to 100 mm. Moreover, it can be understood that the CD value reducing effect is achieved even more markedly in cases in which W is greater than or equal to 10 mm and less than or equal to 30 mm.

[Supplementary Explanation of Above Embodiment]

Figure 7A:
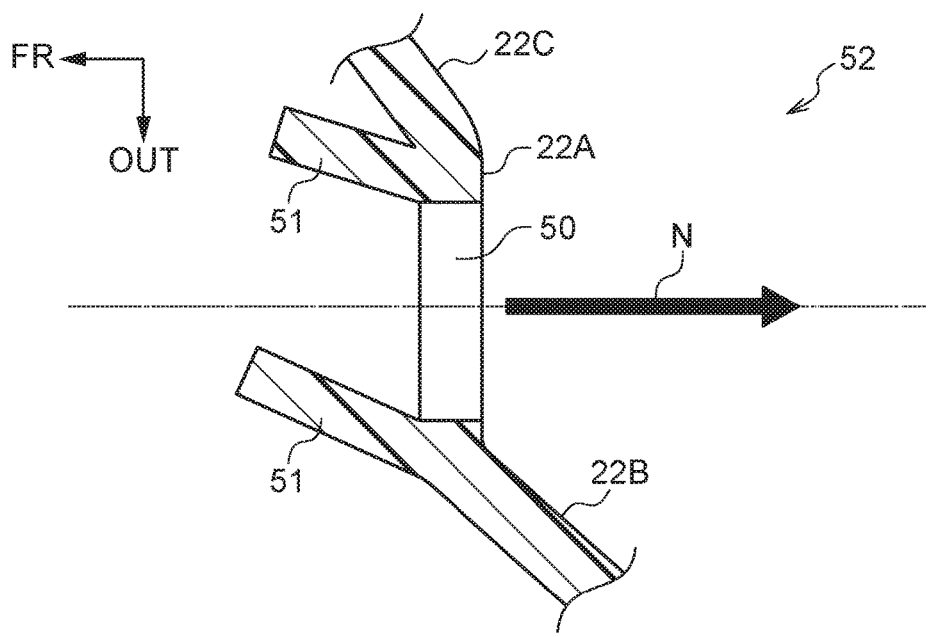
FIG. 7A is an enlarged sectional view showing an air discharging portion relating to a modified example, and is a modified example that has ribs.

Note that, in the above-described embodiment, by making the plate thickness direction of the through-hole base portion 22A be directed obliquely rearward that is toward the vehicle longitudinal direction rear side and the vehicle transverse direction outer side, air is discharged-out from the through-holes 50 obliquely rearward that is toward the vehicle longitudinal direction rear side and the vehicle transverse direction outer side. However, the present disclosure is not limited to this. For example, even if the plate thickness direction of the through-hole base portion 22A is parallel to the vehicle longitudinal direction, air may be discharged-out obliquely rearward that is toward the vehicle longitudinal direction rear side and the vehicle transverse direction outer side by, as shown in FIG. 7A, providing ribs 51, that guide air obliquely rearward, at the vehicle front side of the through-hole 50. In this case, the ribs 51 are included in the "air discharging portion" of the present disclosure.

Figure 7B:
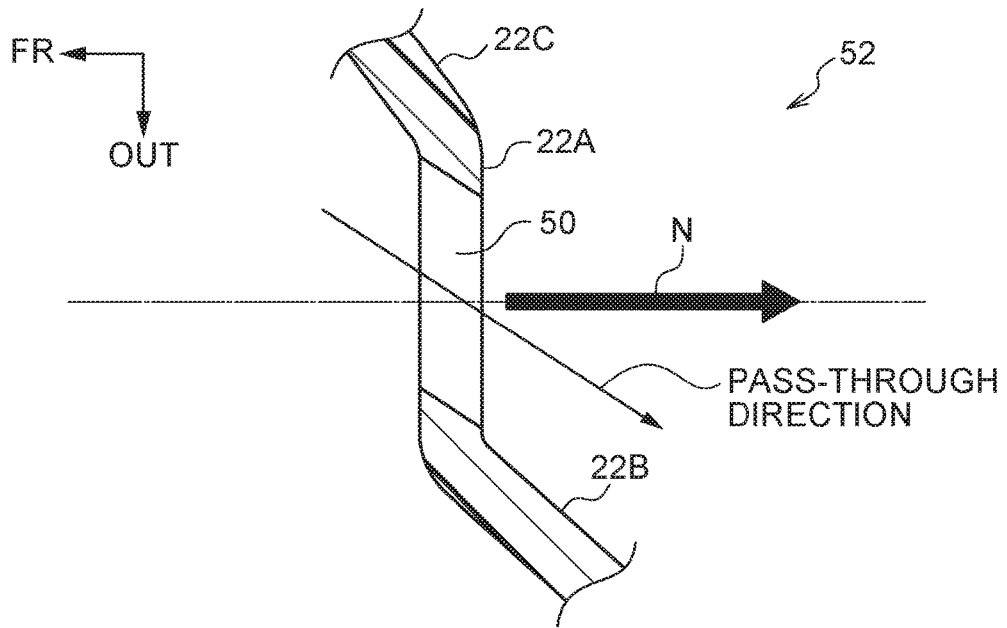
FIG. 7B is an enlarged sectional view showing an air discharging portion relating to a modified example, and is a modified example in which the pass-through direction of the through-hole is directed obliquely rearward.

Further, even if the plate thickness direction of the through-hole base portion 22A is parallel to the vehicle longitudinal direction, air may be discharged-out obliquely rearward that is toward the vehicle longitudinal direction rear side and the vehicle transverse direction outer side by, as shown in FIG. 7B, making direction D, in which the through-hole 50 passes-through the through-hole base portion 22A, be directed obliquely rearward that is toward the vehicle longitudinal direction rear side and the vehicle transverse direction outer side.

Further, in the above-described embodiment, the plural through-holes 50 are formed so as to be lined-up in the vehicle vertical direction, and the shapes of the respective through-holes 50 are made to be shapes of long holes whose length directions are the vehicle vertical direction. However, the present disclosure is not limited to this. For example, the shape of each of the through-holes may be substantially square, and these substantially square through-holes may be formed so as to be lined-up in the vehicle vertical direction. Further, it suffices to not form plural through-holes, and a single through-hole that extends in the vehicle vertical direction may be formed.

The disclosure of Japanese Patent Application No. 2015-223095 that was filed on Nov. 13, 2015 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A wheel house structure comprising:
   a wheel house front wall that structures a wall at a front side of a wheel house in which a front tire is disposed; and
   an air discharging portion that is structured to include one or more through-holes formed along a vehicle vertical direction at a vehicle transverse direction outer side of the wheel house front wall, the air discharging portion discharging air, that is further toward a vehicle longitudinal direction front side than the wheel house front wall, through a through-hole obliquely rearward toward a vehicle longitudinal direction rear side and the vehicle transverse direction outer side.

2. The wheel house structure of claim 1, wherein the one or more through-holes are formed at a height position that includes a vehicle vertical direction substantially central portion of the wheel house front wall.

3. The wheel house structure of claim 1, wherein a plurality of the through-holes are formed.

4. The wheel house structure of claim 1, wherein a plate thickness direction of a through-hole base portion, in which the one or more through-holes are formed, at the wheel house front wall is directed obliquely rearward toward the vehicle longitudinal direction rear side and the vehicle transverse direction outer side.

5. The wheel house structure of claim 4, wherein:
   an inner side adjacent portion, that is adjacent to a vehicle transverse direction inner side of the through-hole base portion, is displaced toward a vehicle front side while heading toward a vehicle transverse direction inner side, and
   an outer side adjacent portion, that is adjacent to a vehicle transverse direction outer side of the through-hole base portion, is displaced toward a vehicle rear side while heading toward the vehicle transverse direction outer side.

6. The wheel house structure of claim 1, wherein ribs that guide air obliquely rearward, are disposed at the vehicle front side of the one or more through-holes, at a through-hole base portion of the wheel house front wall, in which the one or more through-holes are formed.

7. The wheel house structure of claim 1, wherein a direction, in which the one or more through-holes pass through a through-hole base portion of the wheel house front wall, is directed obliquely rearward toward the vehicle longitudinal direction rear side and the vehicle transverse direction outer side.

* * * * *